United States Patent
Chung et al.

(10) Patent No.: US 12,398,072 B2
(45) Date of Patent: Aug. 26, 2025

(54) PROTECTIVE COATING METHOD FOR REINFORCED CONCRETE BUILDINGS AND INFRASTRUCTURE

(71) Applicant: Amerasia International Technology, Inc., Princeton Junction, NJ (US)

(72) Inventors: Kevin Kwong-Tai Chung, Princeton, NJ (US); Albert Han-Ping Chung, Princeton, NJ (US)

(73) Assignee: Amerasia International Technology, Inc., Princeton Junction, NJ (US)

( * ) Notice: Subject to any disclaimer, the term of this patent is extended or adjusted under 35 U.S.C. 154(b) by 0 days.

(21) Appl. No.: 18/631,760

(22) Filed: Apr. 10, 2024

(65) Prior Publication Data

US 2024/0343647 A1    Oct. 17, 2024

Related U.S. Application Data

(60) Provisional application No. 63/546,375, filed on Oct. 30, 2023, provisional application No. 63/472,936, (Continued)

(51) Int. Cl.
*C04B 20/10* (2006.01)
*C04B 14/48* (2006.01)
(Continued)

(52) U.S. Cl.
CPC .......... *C04B 20/1033* (2013.01); *C04B 14/48* (2013.01); *C04B 20/123* (2013.01); (Continued)

(58) Field of Classification Search
CPC ... C04B 20/1033; C04B 14/48; C04B 20/123; C09D 7/20
See application file for complete search history.

(56) References Cited

U.S. PATENT DOCUMENTS 3,377,193 A    4/1968   Stilmar
4,557,977 A    12/1985  Memmer et al.
(Continued)

FOREIGN PATENT DOCUMENTS

CN    111013988 A    4/2020

OTHER PUBLICATIONS

AI-Technology, Inc., "Corrosion Protection With Field Applicable Fluoroseal® PVDF Coatings", dated on or after Jun. 14, 2023, 33 pages, https://www.aitechnology.com/wp-content/uploads/CORROSION-PROTECTION-COATING-FOR-SHIPS-WITH-NOVEL-FLUOROSEAL-PVDF-TECHNOLOGY-for-website-FINAL-with-edits-by-bob-and-finalized-by-Kevin-1.pdf.
(Continued)

*Primary Examiner* — Nathan T Leong
(74) *Attorney, Agent, or Firm* — Clement A. Berard, Esq.; Dann, Dorfman, Herrell and Skillman, PC

(57) ABSTRACT

A method of coating a surface of a concrete structure in situ, which comprises the step of applying to the surface of the concrete of the concrete structure a liquidous coating of a modified polyvinylidene fluoride (PVDF) or polyvinylidene difluoride (PVDF) material in an air dryable solution comprising: a PVDF or a PVDF co-polymer or a combination of PVDF and PVDF copolymer to form a blend with a compatible acrylic and/or other compatible polymer that is fluorinated to between about 30% to about 75% by weight excluding any solvent; the PVDF or PVDF co-polymer or blend thereof having at least about 45% PVDF molecular structure by weight when dried; the PVDF or PVDF co-polymer having a polymer crystallinity of at least about 30% by weight; and a solvent.

20 Claims, 9 Drawing Sheets

Related U.S. Application Data filed on Jun. 14, 2023, provisional application No. 63/459,297, filed on Apr. 14, 2023.

(51) Int. Cl.
  *C04B 20/12* (2006.01)
  *C09D 5/00* (2006.01)
  *C09D 7/20* (2018.01)
  *C09D 127/16* (2006.01)
(52) U.S. Cl.
  CPC .............. *C09D 5/002* (2013.01); *C09D 7/20* (2018.01); *C09D 127/16* (2013.01)

(56) References Cited

U.S. PATENT DOCUMENTS

| | | | |
|---|---|---|---|
| 4,746,693 | A | 5/1988 | Meder |
| 5,026,813 | A | 6/1991 | Meder |
| 5,364,511 | A | 11/1994 | Moreland et al. |
| 5,616,645 | A | 4/1997 | Kuwamura et al. |
| 2006/0043327 | A1 | 3/2006 | Hunter |
| 2006/0210715 | A1* | 9/2006 | Amin-Sanayei ...... C03C 17/006 427/372.2 |
| 2012/0107500 | A1 | 5/2012 | Vanpoulle et al. |
| 2012/0208922 | A1 | 8/2012 | Matthijssen et al. |
| 2013/0273319 | A1 | 10/2013 | Chen et al. |
| 2016/0040440 | A1 | 2/2016 | Wiercinski et al. |
| 2022/0362139 | A1 | 11/2022 | Pannakal et al. |

OTHER PUBLICATIONS

AI-Technology, Inc., "Why does seemingly indestructible concrete buildings and infrastructures need protective coating?", dated on or after Jun. 14, 2023, 44 pages, https://www.aitechnology.com/wp-content/uploads/CONCRETE-PROTECTION-COATING-FOR-BUILDINGS-AND-INFRASTRUCTURES-WITH-NOVEL-FLUOROSEAL-PVDF-TECHNOLOGY-for-website-FINAL-with-Bobs-edits-and-finalized-by-Kevin-1.pdf.
Barrett Hugh, "MOSI Anti-Fouling Coatings for Barnacles and Zebra Mussels", Mar. 21, 2019, 15 pages, https://www.marinelink.com/news/mosi-antifouling-coatings-barnacles-zebra-464264.
AI-Technology, Inc., "Corrosion Protection", date as Jun. 14, 2023 or earlier, 6 pages, https://aitcoatings.com/pages/corrosion-protection-1.
AI-Technology, Inc., "FLUOROSEAL® Applications", dated as Jun. 14, 2023 or earlier, 4 pages, https://aitcoatings.com/pages/fluoroseal%C2%AE-applications.
Julianne Calapa, "PVDF vs. SMP Paint Systems: Which Is Best For Your Metal Roof?", Posted on Feb. 17, 2022, downloaded on Aug. 21, 2024, 16 pages, https://sheffieldmetals.com/learning-center/pvdf-vs-smp/.
Anish, "How Ships Fight Corrosion at Sea", Mar. 25, 2023, downloaded on Aug. 21, 2024, 20 pages, https://www.marineinsight.com/marine-safety/how-ships-fight-corrosion-at-sea/.
National Institute of Standards and Technology, Technology Administration, U.S. Department of Commerce, "Coatings for Corrosion Protection: Offshore Oil and Gas Operation Facilities, Marine Pipeline and Ship Structures", NIST Special Publication 1035, Apr. 14-16, 2004, Biloxi, Mississippi, downloaded on Aug. 21, 2024, 276 pages, https://www.govinfo.gov/content/pkg/GOVPUB-C13-14327283e491f213d199e8c784e520bc/pdf/GOVPUB-C13-14327283e491f213d199e8c784e520bc.pdf (276 pages submitted in 9 parts).
Shivananda Prabhu, "Coatings for Marine Applications & Offshore Platforms", Published: Apr. 16, 2020, Last updated: Jul. 19, 2024, downloaded on Aug. 21, 2024, 23 pages, https://www.corrosionpedia.com/2/1790/industries/coatings-for-marine-applications-offshore-platforms.
Eastman, "Technical Data Sheet—Eastman Texanol Ester Alcohol", Dec. 15, 2021, 3 pages.
Kevin Chung & Albert Chung, "Additional Background of Invention", Apr. 2023, 18 pages.
AGC Chemicals Americas, "LUMIFLON solvent based resins", (c) 2021, downloaded Aug. 21, 2024, 7 pages, https://lumiflonusa.com/products/.
AGC Chemicals, "LUMIFLON®", downloaded Aug. 21, 2024, 10 pages, https://www.agc-chemicals.com/jp/en/fluorine/products/detail/index.html?pCode=JP-EN-F002.
AI Technology, Inc, "Product Data Sheet—Concrete Fluoroseal CRC-V-7150", Ver. 2.2, Jun. 1, 2023, 1 page.
AI Technology, Inc, "Product Data Sheet—Concrete Protection CRC-H-7280", Ver. 2.2, Jun. 1, 2023, 1 page.
AI Technology, Inc, "Product Data Sheet—Concrete Protection CRC-H-7180", Ver. 2.2, Jun. 1, 2023, 1 page.
AI Technology, Inc, "Product Data Sheet—Solarthru Potting/Coating SC7130", Ver. 2.3, Dec. 28, 2023, 1 page.
AI Technology, Inc, "Product Data Sheet—Solar Grip Coating SC7150", Ver. 2.0, Apr. 2, 2018, 1 page.
AI Technology, Inc, "Product Data Sheet—Fluoroseal® SC7130-CC", Ver. 3.8, Nov. 8, 2021, 1 page.
AI Technology, Inc, "Product Data Sheet—Concrete Fluoroseal CRC-V-7130", Ver. 2.1, Apr. 26, 2023, 1 page.
AI Technology, Inc, "Product Data Sheet—FLUOROSEAL® Over-Coating SC7150-UVB", Ver. 2.3, Apr. 20, 2022, 1 page.
AI Technology, Inc, "Product Data Sheet—SolarBloc Fluoroseal® SC7130-UVB", Ver. 2.7, Sep. 28, 2023, 1 page.
AI Technology, Inc, "Product Data Sheet—Solarthru Potting/Coating SC7130-Clear", Ver. 2.2, Nov. 8, 2021, 1 page.
AI Technology, Inc, "Product Data Sheet—Fluoroseal® SCX7130-CC", Ver. 2.2, Jul. 18, 2023, 1 page.
AI Technology, Inc, "Product Data Sheet—Fluoroseal® SCX7180-UCC", Ver. 3.1, Sep. 22, 2022, 1 page.
AI Technology, Inc, "Product Data Sheet—SolarBloc Coating SC7133-Black", Ver. 2.2, Nov. 8, 2021, 1 page.
AI Technology, Inc, "Product Data Sheet—SolarBloc Coating SC7133-White", Ver. 2.1, Nov. 8, 2021, 1 page.
AI Technology, Inc, "Product Data Sheet—Transparent Potting SC7150-LED", Ver. 2.0, Apr. 2, 2018, 1 page.
AI Technology, Inc, "Product Data Sheet—FLUOROSEAL® Over-Coating SC7150-OC", Ver. 2.1, Mar. 28, 2022, 1 page.
ISA/US, International Search Report and Written Opinion, PCT/US24/24219, Jul. 11, 2024, 18 pages.
ISA/US, International Search Report and Written Opinion, PCT/US2024/024230, Jun. 10, 2024, 20 pages.
AI Technology, Inc. "Product Data Sheet—SC7130-CC" Nov. 8, 2021 (Year: 2021).
AI Technology, Inc. "Product Data Sheet—SC7130-Clear" Nov. 8, 2021 (Year: 2021).
AI Technology, Inc. "Product Data Sheet—SC7133-BLACK" Nov. 8, 2021 (Year: 2021).
AI Technology, Inc. "Product Data Sheet—SC7133-WHITE" Nov. 8, 2021 (Year: 2021).
AI Technology, Inc. "Product Data Sheet—SC7150" Apr. 2, 2018 (Year: 2018).
AI Technology, Inc. "Product Data Sheet—SC7150-LED" Apr. 2, 2018 (Year: 2018).

* cited by examiner

| Properties Required for Effective Protection of Vertical Surfaces | SILICONE | Acrylic-Stucco | FLUOROSEAL® for Concrete (CPV7130 Gloss, Air Drying) (CPV7150 Matt, Air Drying) (CPH7280 Crosslinked, Air Drying) |
|---|---|---|---|
| Moisture-Water Permeability (Relative Ingress Number, $g/m^2 \cdot d$) | Very High (>5,000) | High (>20) | Very Low (<0.05) |
| Corrosive Gases (e.g. $H_2S$, $C_2O$, etc.) Permeability ($cm_3/m_2 \cdot d \cdot bar$) | Very High (>5,000) | Very High (>2,000) | Very Low (<0.1) |
| Water Repellant | Good | Good | Good |
| Water Absorption (Retention) | Low | Low | Low |
| UV Molecular Stability (Resistance) | Good (Proven 10-20 Years) | Fair (Proven <10 Years) | Outstanding (Proven >60 Years) |
| Choices of Color | 1. Clear 2. Others | 1. Colored 2. Customized | 1. Colored 2. Customized |
| Field Application Method | Spray, Brush (1-Component, Ambient Storage, Coating Liquid) | Spatter (1-Component, Ambient Storage, Coating Liquid) | Spray, Roller, Brush (1-Component, Ambient Storage, VOC Free, Coating Liquid) |
| Cost of Material and Labor | Similar for material and Labor for the same performance level (Thicker: >200 Micron) | Higher Price for Stucco | Similar for material and Labor for the same performance level (Thickness: >50 Micron) |

The above table summarizes properties of FLUOROSEAL® Concrete Protection Coating CRC-V-7150 and CRC-H-7280 in comparison to silicone and acrylic coatings used.

FIG. 3

Concrete Protection Coating
FLUOROSEAL® CRC-H-7280

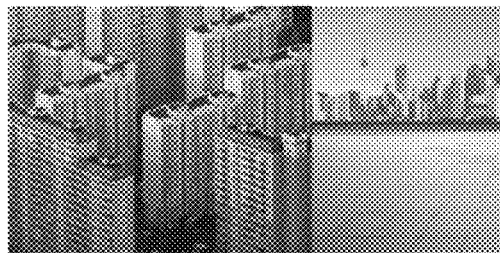

- Fluoropolymer for >60 years outdoor UV protection
- Crosslinked for abrasion resistance and traffic
- For blocking moisture, salt fog and spray, acid rain and moisture from penetrating into concrete
- For blocking $CO_2$, $H_2S$, and other corrosive gases from penetrating into concrete and rebar Interfaces
- Coat directly on concrete surfaces for preventing rebar corrosion and concrete weakening
- Orders of magnitude more effective as moisture and corrosive gases barrier than silicone, acrylic, epoxy and polyurethane

600

FLUOROSEAL® CRC-H-7280

Instruction for proper use of FLUOROSEAL® CRC-H-7280 for outdoor concrete horizontal surfaces (rooftop and walkway) protection:

Content: 5 Gallon
*FOR INDUSTRIAL USE ONLY*

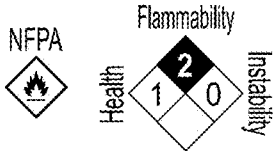

NFPA
Flammability 2
Health 1
Instability 0

KEEP AWAY FROM CHILDREN

DANGER!
CONTAINS VOC EXEMPT
FLAMMABLE SOLVENT
(Please consult SDS before using)

1. FLUOROSEAL® CRC-H-7280 is a clear concrete protection coating designed for outdoor horizontal surface use (rooftop and walkway, not for indoor floorings).
2. Make sure concrete, cement, plaster surfaces are free of dirt, wax, grease and all other contaniments for best adhesion on concrete surfaces and protection of concrete reinforcing steel bars.
3. May be used as UV protection over-coating on epoxy or polyurethane surfaces.
4. Remove any surface condensation before applying concrete protection coating.
5. Shake concrete in container vigorously before using.
6. Make sure enough ventilation is available to avoid breathing in solvent vapor.
7. Coat two passes to ensure complete coverage. Thickness of 25-75 micron is sufficient for best protection. Thicker coating can also be used if deemed needed. Add acetone solvent for dilution.
8. The coating will dry to touch in less than 15 minutes. Ambient curing overnight or longer (depending on ambient temperature) before walking on surface.
9. Ambient temperature stage only.

AI Technology, Inc. 70 Washington Road,
Princeton Junction, NJ 08550, USA
Tel: (609) 799-9388 www.aitcoatings.com
ait@aitechnology.com
*Over 40 Years of Excellence and Leadership
in Advanced Coatings and Adhesives*

CONTAINS: Solvent T-ButylAcetate (540-88-5), Acetone (67-64-1), 2-Heptamone (110-43-0), Propylene carbonate (108-32-7)); Modified flourinated polymer and additives (non-hazardous and proprietary).

DANGER FLAMMABLE: Keep away from sparks, heat or open flames. Vapors will accumulate reedily and may ignite explosively. Keep ventilated during use and until all vapors are gone. DO NOT SMOKE - Extinguish flames, pilot light and heaters, and any other sources of ignition.

VAPOR HARMFUL! Use with adaquate ventilation, avoid continuous breathing of vapor and spray mist. If you experience eye irritation, headaches, or dizziness, increase fresh air or wear respiratory protection (NO SHIME-approved) or leave the area.

FIRST AID - In case of eye contact, flush thoroughly with plenty of water for 15 minutes and get medical attention. For skin contact, wash thoroughly with soap and water. In case of resporatory difficultly, provide fresh air and call physician.

NOTE: INTENTIONAL MISUSE BY DELIBERATELY CONCENTRATING AND INHALING THE CONTENTS MAY BE HARMFUL OR FATAL.

Before using, user shall determine the suitability of the product for his intended use. The manufacturer should not be liable for any injury, loss or damage, direct or consequential, arising out of the use or non-performance with the use of this product. User assumes all risks and liability in-connection with the use of the product.

FIG. 6B

Concrete Protection Coating
FLUOROSEAL® CRC-V-7130

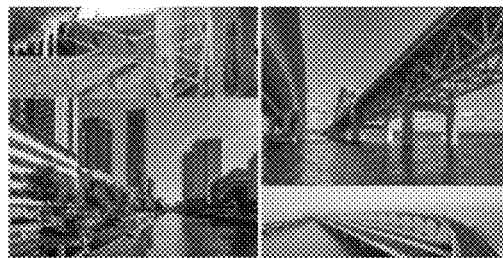

- For blocking moisture, salt fog and spray, acid rain and moisture from penetrating into concrete

- For blocking CO₂, H₂S, and other corrosive gases from penetrating into concrete and rebar Interfaces

- Coat directly on concrete surfaces for preventing rebar corrosion and concrete weakening

- Orders of magnitude more effective as moisture and corrosive gases barrier than silicone, acrylic, epoxy and polyurethane

- Fluoropolymer proven with > 60 Years UV Stability

Content: 5 Gallon
*FOR INDUSTRIAL USE ONLY*

NFPA  

KEEP AWAY FROM CHILDREN

| DANGER! |
| --- |
| CONTAINS VOC EXEMPT FLAMMABLE SOLVENT |
| (Please consult SDS before using) |

FLUOROSEAL® CRC-V-7130

INSTRUCTION FOR PROPER USE OF TRANSPANT FLUOROSEAL® CRC-V-7130 (GLOSS FINISH) CONCRETE PROTECTION COATING:

1. FLUOROSEAL® CRC-H-7280 concrete protection coating is designed for use on vertical surfaces of concrete only. Do not use for concrete floor protection.

2. Make sure concrete, cement, plaster surfaces are free of dirt, wax, grease and all other contaniments for best adhesion on concrete surfaces and protection of concrete reinforcing steel bars.

3. Mask all areas that do not need protection if applicable.

4. Remove any surface condensation before applying concrete protection coating.

5. Shake concrete in container vigorously before using.

6. Make sure enough ventalation is available to avoid breathing in solvent vapor.

7. Coat two passes to ensure complete coverage. Thickness of 25-75 micron is sufficent for best protection. Thicker coating can also be used if deemed needed. Add acetone solvent for dilution if for spray coating whatever needed.

8. The coating will dry to touch in less than 15 minutes. Ambient dry overnight for complete coating curing.

9. Ambient temperature stage only. If content frozen to get warm bottle with content in warm water bath.

AI Technology, Inc. 70 Washington Road,
Princeton Junction, NJ 08550, USA
Tel: (609) 799-9388 www.aitcoatings.com
ait@aitechnology.com
*Over 40 Years of Excellence and Leadership
in Advanced Coatings and Adhesives*

CONTAINS: Solvent T-ButylAcetate (540-88-5), Acetone (67-64-1), 2-Heptamone (110-43-0), Propylene carbonate (108-32-7)); Modified flourinated polymer and additives (non-hazardous and proprietary).

DANGER FLAMMABLE: Keep away from sparks, heat or open flames. Vapors will accumulate reedily and may ignite explosively. Keep ventilated during use and until all vapors are gone. DO NOT SMOKE - Extinguish flames, pilot light and heaters, and any other sources of ignition.

VAPOR HARMFUL! Use with adaquate ventilation, avoid continuous breathing of vapor and spray mist. If you experience eye irritation, headaches, or dizziness, increase fresh air or wear respiratory protection (NO SHIME-approved) or leave the area.

FIRST AID - In case of eye contact, flush thoroughly with plenty of water for 15 minutes and get medical attention. For skin contact, wash thoroughly with soap and water. In case of resporatory difficultly, provide fresh air and call physician.

NOTE: INTENTIONAL MISUSE BY DELIBERATELY CONCENTRATING AND INHALING THE CONTENTS MAY BE HARMFUL OR FATAL.

Before using, user shall determine the suitability of the product for his intended use. The manufacturer should not be liable for any injury, loss or damage, direct or consequential, arising out of the use or non-performance with the use of this product. User assumes all risks and liability in-connection with the use of the product.

FIG. 7B

PROTECTIVE COATING METHOD FOR REINFORCED CONCRETE BUILDINGS AND INFRASTRUCTURE

This Application claims the benefit and priority of U.S. patent application Ser. No. 63/546,375 filed Oct. 30, 2023, entitled "PROTECTION COATING METHOD FOR REINFORCED CONCRETE BUILDINGS AND INFRASTRUCTURE," and claims the benefit and priority of U.S. patent application Ser. No. 63/472,936 filed Jun. 14, 2023, entitled "PROTECTION COATING METHOD FOR REINFORCED CONCRETE BUILDINGS AND INFRASTRUCTURE," and further claims the benefit and priority of U.S. patent application Ser. No. 63/459,297 filed Apr. 14, 2023, entitled "PROTECTION COATING METHOD FOR REINFORCED CONCRETE BUILDINGS AND INFRASTRUCTURE," each of which is hereby incorporated herein by reference in its entirety for all purposes.

The present Application relates to a method of coating a surface of a concrete structure in situ, which comprises the step of applying to the surface of the concrete of the concrete structure a liquidous coating of a modified polyvinylidene fluoride or polyvinylidene difluoride (PVDF) material in an air dryable solution.

Reinforced concretes and their proven strength and durability are the foundation of the beautiful and long-lasting high-rise buildings and infrastructures.

The partial collapse of the Florida Champlain Towers South (a 12-floor condominium in Surfside, FL) on Jun. 24, 2021 is shaking the building industry. There is now an industry call to revamp how high-rise buildings are to be constructed and maintained.

According to Wikipedia: "Concrete is mostly damaged by the corrosion of reinforcement bars due to the carbonation of hardened cement paste or chloride attack under wet conditions." We believe the Wikipedia quote here summarizes the factors that contribute to most of the damage to reinforced concrete structure.

Firstly, damage results from wet or moisture laden conditions inside the concrete along with CO2 and other acidic agents to change the chemistry of the concrete and/or corrode the steel reinforcing bars ("rebars"). That is, buildings in tropical zone and/or in a sea facing area are more susceptible to a larger amount of water penetrating inside the concrete and the concrete-rebar interfaces. Chemically more active areas where salts dissolve into the concrete pores and interstitial spaces that store the water in pockets and in moisture laden places with dissolved salts that will accelerate the chemical reactions such as carbonation and alkali reactions.

Secondly, if there are sources of corrosive gases, such as $H_2S$, $SO_2$, $CO_2$, NO, $CL_2$ in the air, those gases can penetrate into the concrete and react with the water within the concrete and concrete-rebar interfaces, along with corrosive gases that are dissolved in or carried by moisture penetrating into the concrete, wherein corrosion of steel rebars and the like form spaces between the rebars and the concrete that will also weaken the reinforced concrete.

Thirdly, for those buildings and infrastructure that are situated in a temperate climate and in colder zones where daily temperatures fluctuate above and below freezing temperature, the expansive force from the trapped water freezing will also cause the micro-fracturing of the concrete and thus weakening of the reinforced concrete.

Traditionally, reinforced concrete structures are considered strong and impervious to corrosive attacks. They are generally not protected, but may be more protected by a façade on the outside for more expensive buildings. For less expensive buildings, they may simply be protected with cement, plasters, or stucco, or sometimes water-based acrylic or silicone coatings.

Applicant believes there is a need for a better method for protecting concrete buildings and infrastructure, including reinforced concrete buildings and infrastructure.

Accordingly, a method of coating a surface of a concrete structure in situ, which comprises the step of applying to the surface of the concrete of the concrete structure a liquidous coating of a modified polyvinylidene fluoride (PVDF) or polyvinylidene difluoride (PVDF) material in an air dryable solution comprising: a PVDF or a PVDF co-polymer or a combination of PVDF and PVDF copolymer to form a blend with a compatible acrylic and/or other compatible polymer that is fluorinated to between about 30% to about 75% by weight excluding any solvent; the PVDF or PVDF co-polymer or blend thereof having at least about 45% PVDF molecular structure by weight when dried; the PVDF or PVDF co-polymer having a polymer crystallinity of at least about 30% by weight; and a solvent.

In summarizing the arrangements described and/or claimed herein, a selection of concepts and/or elements and/or steps that are described in the detailed description herein may be made or simplified. Any summary is not intended to identify key features, elements and/or steps, or essential features, elements and/or steps, relating to the claimed subject matter, and so are not intended to be limiting and should not be construed to be limiting of or defining of the scope and breadth of the claimed subject matter.

BRIEF DESCRIPTION OF THE DRAWING

The detailed description of the preferred embodiment(s) will be more easily and better understood when read in conjunction with the FIGURES of the Drawing which include:

FIG. 3 is a chart comparing certain prior art coatings with an example suitable PVDF coating;

FIGS. 6A-6B are a technical data sheet for an example liquidous PVDF coating of the sort employed in the described embodiments; and FIGS. 7A-7B are a technical data sheet for another example liquidous PVDF coating of the sort employed in the described embodiments.

Figure 1:
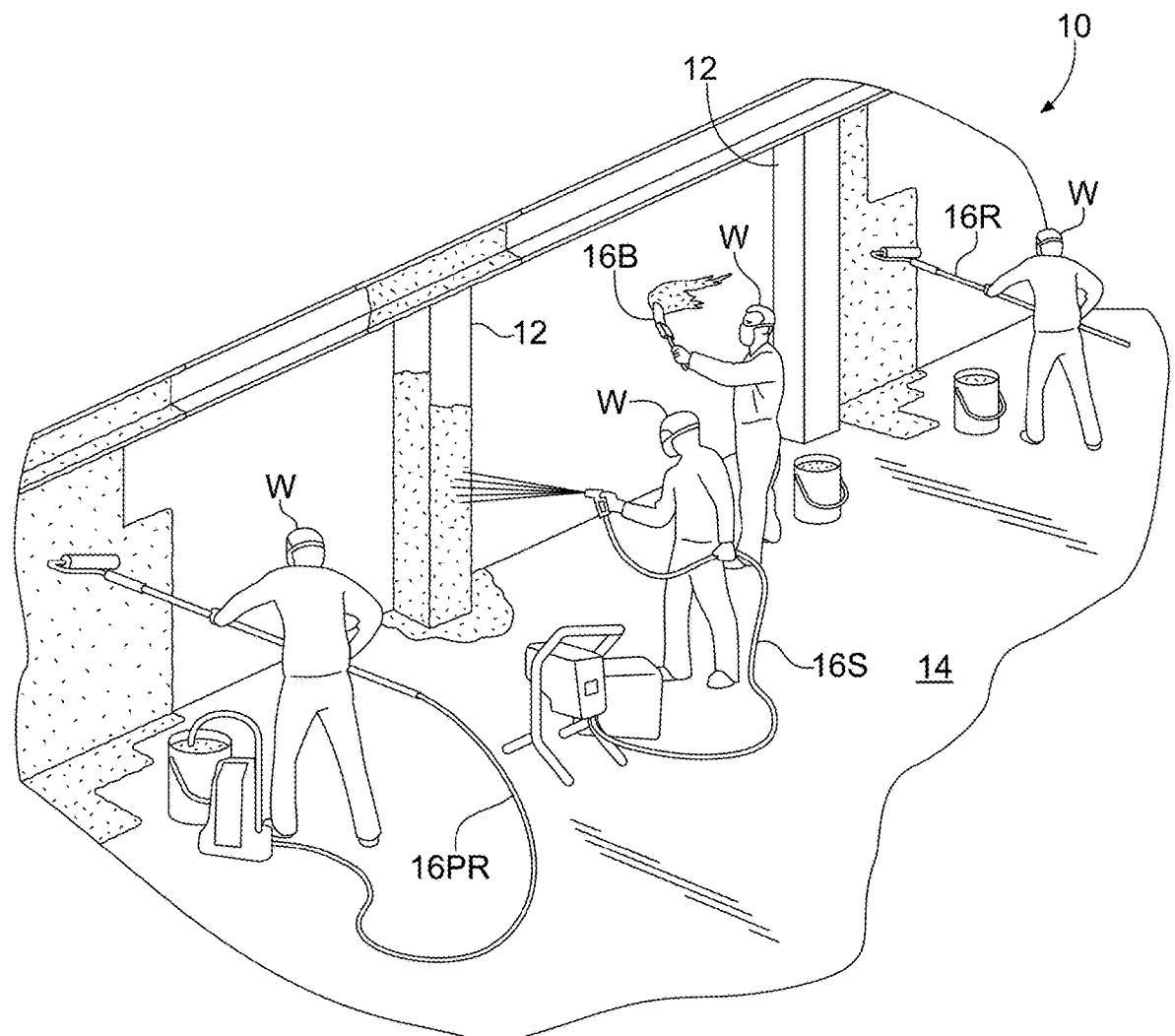
FIG. 1 is an illustration of an example embodiment of applying the example liquidous coating to a concrete structure by spraying, rolling and/or brushing.

In the Drawing, where an element or feature is shown in more than one drawing figure, the same alphanumeric designation may be used to designate such element or feature in each figure. Similar elements or features may be designated by like alphanumeric designations in different figures of the Drawing and with similar nomenclature in the specification. As is common, the various features of the drawing are not to scale, the dimensions of the various features may be arbitrarily expanded or reduced for clarity, and any value stated in any Figure is by way of example only.

DESCRIPTION OF THE PREFERRED EMBODIMENT(S)

Traditionally, reinforced concrete structures are generally considered strong and impervious to corrosive attacks. They are generally not protected, but may be more protected by a façade on the outside for more expensive buildings. For less expensive buildings, they may simply be protected with cement, plasters, or stucco, or sometimes water-based acrylic or silicone coatings.

FEVE (fluoroethylene vinyl ether) coatings such as LUMIFLON® coatings from AGC Chemicals America ("AGC") are available, and while they may have some UV resistance as a fluorinated polymer, they do not have the same molecular structure or moisture impermeability as the PVDF coating materials described below.

FEVE field applicable coatings such as LUMIFLON® coatings from AGC are available. (https://lumiflonusa.com/) "LUMIFLON® solvent based resins have been in use for over 35 years, in applications as diverse as bridge coatings, coil coatings for architectural applications, automotive coatings, and aerospace coatings, to improve weatherability and appearance. These ultra-weatherable resins can be formulated into coatings with a wide range of gloss and color. They can be used in the field for re-coating of structures, or in the shop to manufacture pre-coated panels." FEVE resins are thermosetting while PVDF is thermoplastic.

The technical problem with most conventional coating materials, including some fluorinated polymers, that reduce or inhibit the passage of moisture and/or undesirable gases is that they require application and/or curing processes that can only be performed in a controlled setting, and as a result, they can only be applied on relatively small articles that can be processed in such controlled setting, e.g., typically in a building or shelter with specialized equipment.

This renders such materials unsuitable for coating concrete structures, e.g., buildings, bridges, culverts, and the like, which are too large to be moved and so are constructing in place, i.e. in situ, and/or are too large to be coated in such size-limited controlled settings.

In addition, most known coating materials, while they may reduce the passage of moisture and/or undesirable gases, do not substantially block the passage of moisture and/or such gases which is necessary to effectively protect the concrete and the reinforcing elements therein, e.g., reinforcing bars, reinforcing mesh and beams, from the corrosion, carbonation, and other degradation that is the inevitable result of intrusion of moisture and such gases, which leads to the weakening of the concrete structure and, in many cases, can lead to its failure.

Figure 2:
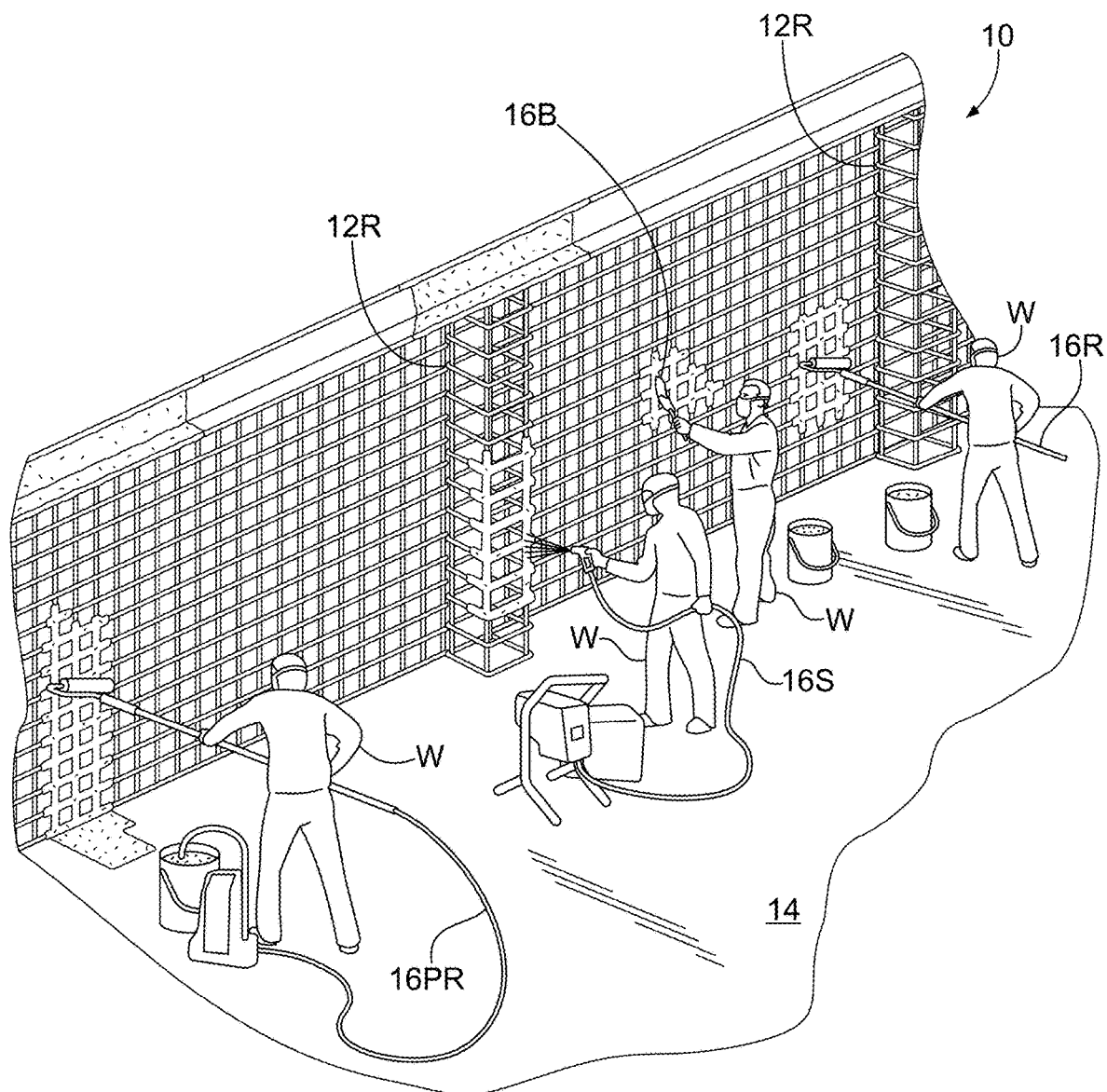
FIG. 2 is an illustration of an example embodiment of applying the example liquidous coating to a structural part for a concrete structure by spraying, rolling and/or brushing.

FIG. 1 is an illustration of an example embodiment of the method for applying the example liquidous coating to a concrete structure by spraying, rolling and/or brushing; and FIG. 2 is an illustration of an example embodiment of the method for applying the example liquidous coating to a structural part for a concrete structure by spraying, rolling and/or brushing. Therein the structure 10 may include vertical structure 12 or horizontal structure 14, e.g., a ceiling to floor, or both, and/or a part 12R of a vertical structure 12 or a part 14R of a horizontal structure 14 or both. A worker W may apply the liquidous coating material using a sprayer 16S, a roller 16R, a power roller 16PR, a brush 16B, or a combination thereof, as may be desired and efficient in any particular situation.

The method described herein is particularly suited for structural and load bearing parts of concrete structures, e.g., primarily the vertical parts thereof as well as some horizontal beams thereof, especially in high rise reinforced concrete structures and infrastructures. Lesser beams and even floors, e.g., in structures that can receive heavy loads such as bridges, parking garages, reinforced building cores, and the like, can also benefit from the method described herein. Even non-load bearing parts of concrete structures, which often include metal mesh and the like, can benefit from the method described herein.

This method is applicable to structures that are constructed above ground level including the footings, foundations and basements thereof, those constructed at about ground level, and those constructed underground, e.g., underground parking decks and garages, rail and road tunnels, concrete supports for on and above ground structures, underground storage facilities, and the like. For structures and parts thereof that are underground, the PVDF coatings should be applied thereto prior to filling in around such underground structures with earth, gravel, sand and/or other fill materials.

Concrete structures in which motor vehicles are operated or pass through, are likely exposed to exhaust gases and tracked in materials, e.g., road salts, snow and ice melting compounds, that are likely to contribute to and/or increase the deterioration of concrete and its internal reinforcement. Accordingly, this method should be utilized to apply the PVDF coatings described herein to the interior surfaces thereof wherein motor vehicles are operated.

The method described herein can also effectively protect the concrete and the reinforcing elements of concrete structures, e.g., reinforcing bars, reinforcing mesh and beams, from the corrosion, carbonation, and other degradation that is the inevitable result of intrusion of moisture and such gases, thereby to reduce or avoid weakening of the concrete structure.

In other words, this method is particularly suited to preserve the structural and load bearing aspects of concrete structures, and in particular reinforced concrete structures, both existing structures and structures under construction. The PVDF protective coatings to which the method described herein pertains has many beneficial characteristics, including for blocking moisture, water, sea water, corrosive gases and the like, and for resisting corrosion, and so may be referred to interchangeably herein as, e.g., a coating, a protective coating, a PVDF coating, and/or an anti-corrosion coating.

Applicant has discovered that certain modified PVDF (polyvinylidene fluoride or polyvinylidene difluoride) liquid coating materials have superior ability to substantially block the passage of moisture and undesirable gases and that can be applied to concrete structures "in the field," i.e. where they are located or in situ, without requiring a controlled factory environment. Applicant's coating materials can be applied to the concrete of new structures and existing structures, and/or to the reinforcing elements thereof before they are embedded in concrete. The terms structure, concrete structure and reinforced concrete structure are used interchangeably herein to include the others as well as reinforcing thereof.

FIG. 3 is a chart comparing certain prior art coatings, e.g., silicone coatings and acrylic-stucco coatings, with an example suitable PVDF coating, e.g., of the sort of PVDF coatings described herein. Therein, the PVDF coatings have a very low permeability by moisture—water and corrosive gases, thereby blocking moisture, water and corrosive gases, whereas the other materials have very high permeability thereby. In addition, the PVDF materials exhibit over 60 years of UV molecular stability, e.g., resistance to degradation from UV light, whereas the other materials provide much shorter lifetimes, e.g., only 10-20 years.

Applicant understands that concrete when fresh is alkaline, e.g., it has a pH of about 12-14, and when $CO_2$ infiltrates the concrete it forms carbonic acid which is acidic and degrades the concrete through carbonation. In addition, when moisture (water and/or salt water) enters the concrete of a concrete structure it comes into contact with the metal reinforcing members, e.g., rebar, metal beams, mesh of the concrete structure, beams, and the like, which will then corrode and weaken the structure. The effect of carbonic acid also degrades such reinforcing members. Carbonation causes the alkalinity of the concrete to decrease and to become closer to a neutral or acidic pH to provide the corrosion environment that degrades the steel or other reinforcement in the reinforced concrete structure.

Common reinforcing elements used to reinforce concrete may include elements of iron, steel, aluminum, copper, another non-noble metal, and/or alloys thereof. Stainless steels are alloys of steel that are less subject to corrosion and rusting than is common inexpensive steel, however, while the use of reinforcing members made from stainless steel tends to extend the time until corrosion of the reinforcing elements becomes a problem, it does so at great expense. Using stainless steel reinforcement does not remove the source of the corrosion problem.

Applicant's polyvinylidene fluoride or polyvinylidene difluoride liquid coating materials can be applied to concrete structures in situ because they are thermoplastic and/or ambient cross-linkable crosslinked polymer materials, rather than high temperature melt bonding or thermosetting crosslinking materials which require curing at high temperature under controlled conditions that are only practical in a factory setting.

Notwithstanding the foregoing, Applicant's method can also be practiced in a factory or other controlled setting where relatively smaller concrete structures, e.g., pipes, culverts, beams, crossties, and the like, can be manufactured.

Applicant has developed a new method using air dryable liquidous PVDF coating solutions that can be applied in the field and that can block corrosive elements from penetrating inside the concrete to cause rebar corrosion, concrete carbonation and moisture-related weakening of the reinforced concrete.

These coatings are believed to be the only field applicable PVDF liquid coatings that have been proven in use in electronics, electrical and structural applications by AI Technology, Inc. engineers.

Figure 4:
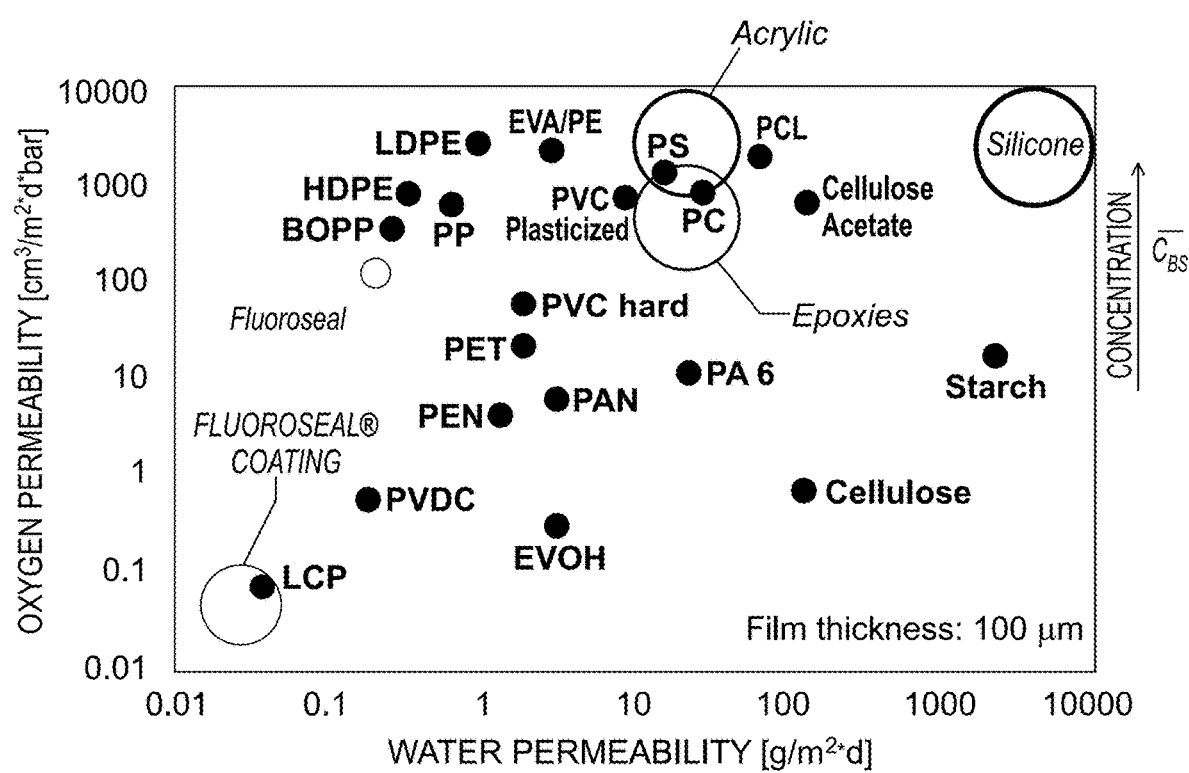
FIG. 4 is a chart illustrating the permeability characteristics of various materials including the example coating materials utilized in the present method.

FIG. 4 is a chart illustrating the permeability characteristics of various materials including the example coating materials utilized in the present method. The PVDF coating materials according to the present arrangement exhibit clearly better, e.g., lower, permeability of oxygen and water as compared to other materials, including acrylics, epoxies and silicones. The thickness of the films of those materials is 100 μm (microns) which is in the preferred range of thicknesses of the PVDF films described herein. The performance of the PVDF material is seen to be clearly superior to the other tested materials by orders of magnitude.

Figure 5:
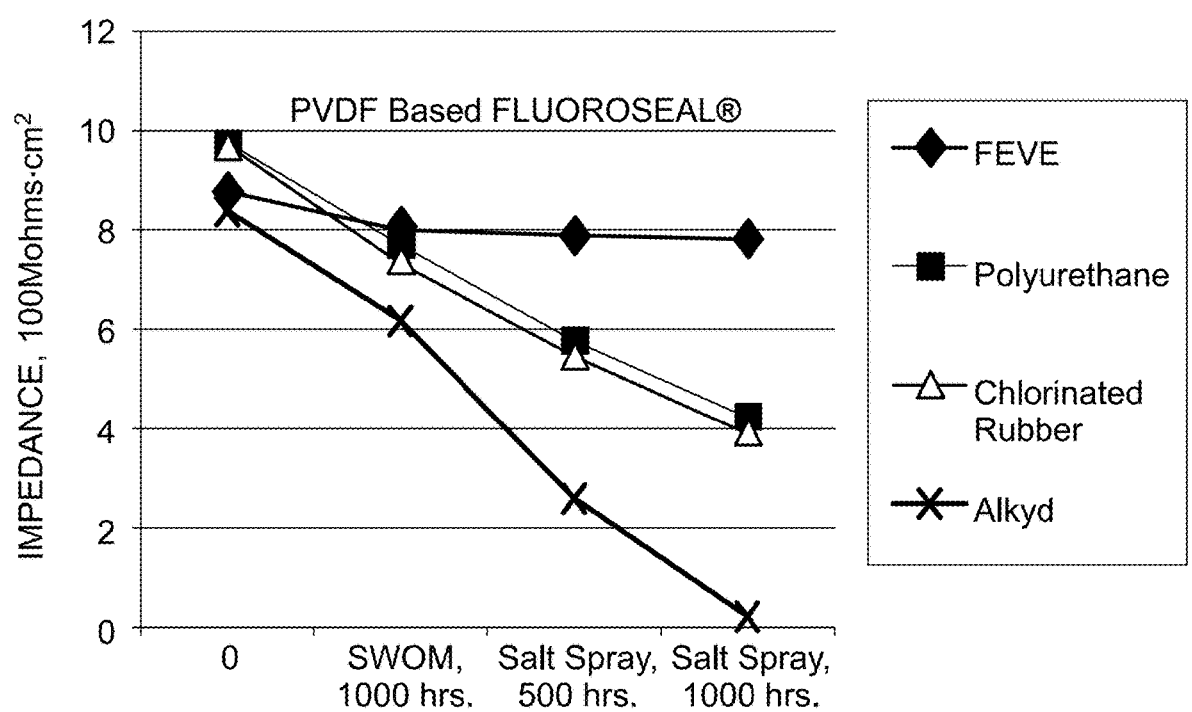
FIG. 5 is a graphical representation illustrating the impedance characteristics of various coating materials and of the example coating materials utilized in the present method.

FIG. 5 is a graphical representation illustrating the electrical impedance characteristics of various coating materials and of the example coating materials utilized in the present method. Data points from such impedance testing are presented at "0" which is the material characteristic before being exposed to potentially impedance reducing substances and/or conditions. The other data points are for the SWOM (Sunshine Carbon Arc Weather-Ometer®) test and for exposure to salt spray for 500 hours and for 1000 hours. The performance of the PVDF material is seen to be clearly superior to the other tested materials.

Electrical impedance testing provides a good indication relative to the penetration of moisture that is laden with salt and other ionic impurities, including, e.g., sodium and chloride, that cause corrosion. Electrical impedance also provides an indication for assessing effects from acid rain and other moisture and water carrying corrosive elements, such as $H_2S$, $SO_2$, $CO_2$ and other corrosive gases. Blocking moisture and preventing it from carrying ionic impurities and acidic elements into concrete and reinforcing members therein is very important to protecting the underlying structural materials and coatings.

Conventional PVDF (polyvinylidene fluoride or polyvinylidene difluoride) coatings have been traditionally applied in the factory for preventing corrosion for metals for many years. They must be melt-fused and bonded at relatively high temperature and cannot be applied in the field or on a structure as large and as varied as buildings and infrastructures.

"Polyvinylidene fluoride or polyvinylidene difluoride is a highly non-reactive thermoplastic fluoropolymer produced by the polymerization of vinylidene difluoride. PVDF is a specialty plastic used in applications requiring the highest purity, as well as resistance to solvents, acids and hydrocarbons." (Wikipedia).

Suitable air drying PVDF coating materials useful in the described method include, e.g., FLUOROSEAL® coatings such as SC-7130; SC-7150; SC-7130-CC; SC-7150-UVB; SC-7130-UVB; SC-7130-series, SC-7150-series, SC-7133-series, SCX-7153-series of products, consisting primarily of PVDF polymer and co-polymer and blends, are available commercially from AI Technology, Inc., which has a business location at 70 Washington Road, Princeton Junction, NJ 08550, USA.

These coating products are available, e.g., from AI Technology, and were developed for protecting electronic circuits and metal structure or metallic structure with epoxy, polyurethane as over-coating protection. AI Technology's CRC-V-7130 and CRC-V-7150 coating products for vertical surfaces and CRC-H-7180 and CRC-H-7280 coating products for horizontal surfaces, and CPC7550, CPC7650, CPC7750, CPC7150 and CPC7130 series coating products, are also suitable for use in the described method and are usable on metal and concrete structures.

FIGS. 6A-6B are a technical data sheet for one example liquidous PVDF coating, e.g., a CRC-H-7280 coating material, of the sort employed in the described embodiments; and FIGS. 7A-7B are a technical data sheet for another example liquidous PVDF coating, e.g., a CRC-V-7130 coating material, of the sort employed in the described embodiments.

In the present invention, highly fluorinated polymer-based coatings that are in liquid solution formats are used for concrete protection coating. These protective coatings can be applied in the field by brushing (including rolling), rolling and spraying methods onto new or existing buildings and other structures.

Important factors for this inventive protection coating method include the following:
1. The coatings must be in the form of liquid solution that can be applied in the field to buildings and infrastructure.

2. The coating must be highly fluorinated to the level of at least 30%, and preferably more than 40%; or more preferably with PVDF or PVDF copolymer or blends thereof that have more than 60% by weight of PVDF molecular structure. For the top coating, if any, it is preferred that more than 90-100% of the PVDF molecules be in mono or copolymers.
3. Even more preferably, they are based on PVDF or PVDF co-polymers that maintain a high degree of polymer crystallinity of at least 30% and preferably more than 40%.
4. These coatings must have adhesion properties on concrete with cross-hatch adhesion of 3B or better.
5. Thickness of the coating should be at least 10-25 microns, and preferably 50 microns; thicker coatings are not required and may not be desired for other reasons including cost.
6. Preferably the coating is transparent or clear unless required to be pigmented or dyed for decoration. UV fluorescent dye may be added, if desired, to make inspection easier for transparent coatings.

The unit "micron" or "microns" (plural) is a common term for a micro-meter or μm, i.e. one millionth of a meter, in the metric system of measurement of the International System of Units (IS).

Applicant has found that the amount of the PVDF materials in the PVDF liquid coatings described herein should be less than about 75% so as to have sufficient adhesion to concrete and should be at least about 30% so as to provide a sufficiently robust barrier to water, salt, chemicals and other substances that are deleterious to concrete and/or to the metal reinforcements embedded therein. Accordingly, about 50% to 70% by weight of the PVDF materials is believed to be a desirable range for the present invention. The weight percentages herein are exclusive of any inorganic and/or metallic additives.

The PVDF or a PVDF co-polymer or a combination of PVDF and PVDF copolymer are preferably blended with a compatible acrylic and/or other compatible polymer that is fluorinated to between about 30% to about 75% by weight excluding any solvent. The compatible acrylic and/or other compatible polymer change the polarity of the polarity of the PVDF components so that the coating will have good adhesion to the surface to which it is applied, e.g., a concrete structure and other materials, to which a purely PVDF coating will not have good adhesion. Compatible acrylic polymers and/or other compatible polymers include those that can be dissolved into the PVDF coating solution and that dry in air to form a coating film on the surface to which the coating is applied, e.g., to concrete structures. Preferably, the compatible acrylic and/or other compatible polymer should be at least 25% by weight and below 50% by weight so as to provide good adhesion while the primary properties of the PVDF molecular structure to stop infiltration of moisture, corrosive gases and the like is maintained.

Additionally and optionally, a PVDF over coating or top coating in the form of a liquid coating may be applied over the PVDF liquid coating described herein after it has been applied to the concrete structure and has been allowed to cure, e.g., to air dry. PVDF liquid over coating is similar to the PVDF liquid coating previously described except that the over coating will be highly fluorinated to the level of at least 70%, and in some cases up to 100%, with PVDF or PVDF copolymer or blends thereof that have more than 60% by weight of PVDF molecular structure.

Such PVDF over coating should be applied in a like range of thicknesses and in like manners to those described above for the PVDF coating that is applied directly to the concrete structure. The PVDF over coating will further extend the duration of the protection barrier provided by the PVDF coating on the concrete against water, salt, chemicals and other deleterious substances.

A method of protecting reinforced concrete with a coating, may comprise:
applying a liquidous coating to a concrete structure,
wherein the liquidous coating solution once dried has at least the following properties:
the polymer portion of the coating when dried has at least 30% of fluorinated polymer segments in the PVDF homopolymer, copolymer or polymer blend;
the first coating also has at least 30% of an acrylic or other compatible polymer;
the coating is in a liquidous form that can be applied by spraying and/or by brushing, or by another application method, onto concrete surfaces,
the coating as applied is air dryable; and
the coating as applied has more than 3B cross-hatch adhesion onto a flat concrete surface.

The coating may have a thickness of at least 10-25 microns, and preferably of 50 microns to 100 microns, and more preferably of less than 200 microns. The fluorinated polymer may comprise at least 50% of polyvinylidene fluoride (PVF2 or polyvinylidene difluoride) in its molecular composition and more preferably more than 60% of PVDF molecular in the polymer composition. The coating may have more than 20% elongation capability without fracturing and even more preferably more than 50% elongation without fracturing. The coating may have a major portion of its molecular structure having a glass transition temperature of lower than 0° C., and preferably lower than −20° C., and even more preferably lower than −40° C. The coating preferably is transparent or clear. The coating if pigmented, may be pigmented with pigments including $TiO_2$, Zn oxide, Zinc sulphate, Barium sulphate, carbon black, and/or a combination thereof. The coating may be applied to the exterior of a building or other structure. The coating may be applied to a surface of the concrete structure that is exposed to an atmospheric environment. The coating may be applied to a vertical surface of the concrete structure. The coating is applied by spraying and/or by brushing.

The method of coating a surface of a concrete structure in situ, of claim 1, may further comprise the step of applying to the surface of the coating of a modified polyvinylidene fluoride or polyvinylidene difluoride (PVDF) material applied on the concrete of the concrete structure a liquidous over-coating of a modified polyvinylidene fluoride or polyvinylidene difluoride (PVDF) material in an air dryable solution comprising:
(a) a PVDF or a PVDF co-polymer or a blend thereof that is fluorinated to between about 30% to about 75% by weight excluding any solvent;
(b) the PVDF or PVDF co-polymer or blend thereof having at least about 75% PVDF molecular structure by weight when dried;
(c) the PVDF or PVDF co-polymer having a polymer crystallinity of at least about 30% by weight; and
(d) a solvent selected from the group consisting essentially of ketones, acetate, ester alcohol, propylene carbonate, a combination thereof, and combinations of solvents having a polarity index in the range of about 3.0 to 7.0.

The step of applying the over-coating of a modified PVDF material may comprise: applying the over-coating using a brush or using a roller or using a spraying device or using a combination of the foregoing. The over-coating of the modified PVDF material may have a thickness of between about 25 microns and 200 microns. The over-coating of the modified PVDF material may have a thickness of less than about 150 microns. The over-coating of the modified PVDF material has a thickness of at least about 50 microns. The modified PVDF material in an air dryable solution may further comprise: an acrylic, an epoxy, a polyurethane, or a blend thereof, of less than 25% by weight. The surface of the concrete structure may have been previously coated with an epoxy, an acrylic, an alkyd, a polyurethane or another polar coating.

From the experience of the collapse of the Champlain Towers South, professional inspections, even with the best effort, still cannot predict or enable providing proper alerts when the damage is mostly internal rather than obvious, i.e. being externally visible.

That is, for a comfortable margin of safety, any signs of the beginning of corrosion or of structural damage should be treated seriously.

AI Technology scientists and engineers believe that the exterior surfaces of all reinforced concrete structures that are directly exposed to the weather ideally should immediately be coated with a corrosion prevention coating that practically blocks substantially all moisture and corrosive gases from penetrating inside the reinforced concrete from the exterior surfaces.

Interior surfaces where temperature and humidity are kept within human living condition ranges may be exempted with the same treatment. However, those structures where interior and exterior faces the same weather environment should also be coated with the same corrosion protection barrier coating that blocks substantially all moisture and corrosive gases.

As used herein, the term "PVDF" refers to a modified polyvinylidene fluoride material and/or to a polyvinylidene difluoride material, as well as to blends and copolymers thereof. "PVDF" and "polyvinylidene fluoride or polyvinylidene difluoride" liquid coating materials include, for example: polyvinylidene fluoride solvent-based liquid coating materials, polyvinylidene difluoride liquid coating materials, and a combination of polyvinylidene fluoride liquid coating materials and polyvinylidene difluoride liquid coating materials. In some instances, such liquid coating materials may also include additives, e.g., pigments, colorants, inorganic and/or metallic fillers, other additives, and the like, that do not materially degrade the ability of such coating materials to substantially block the passage of moisture and/or undesirable gases and the like.

The term in situ is a Latin phrase that translates literally to "on site" or "in position." It can mean "locally", "on site", "on the premises", or "in place" to describe where an event takes place. As used herein "in situ" includes places where buildings, bridges, towers and other structures exist and/or are constructed, assembled, manufactured or otherwise made, whether indoors and/or outdoors, and includes the exteriors and/or the interiors thereof. Thus in situ includes on-site construction as well as manufacture in a factory or other facility.

A method of coating a surface of a concrete structure in situ, which comprises the step of applying to the surface of the concrete of the concrete structure a liquidous coating of a modified polyvinylidene fluoride or polyvinylidene difluoride (PVDF) material in an air dryable solution comprising: a PVDF or a PVDF co-polymer or a combination of PVDF and PVDF copolymer to form a blend with compatible acrylic and/or other compatible polymer that is fluorinated to between about 30% to about 75% by weight excluding any solvent; the PVDF or PVDF co-polymer or blend thereof having at least about 45% PVDF molecular structure by weight when dried; the PVDF or PVDF co-polymer having a polymer crystallinity of at least about 30% by weight; and a solvent selected from the group consisting essentially of ketones, acetate, ester alcohol, propylene carbonate, a combination thereof, and combinations of solvents having a polarity index in the range of about 3.0 to 7.0; wherein the coating has a cross-hatch adhesion to concrete of at least 3B when measured using the ASTM D3359 Method B scale.

The method of coating a surface of a concrete structure in situ, which further comprises the steps of: brushing the surface of the concrete or cleaning the surface of the concrete with a cleaning agent selected from the group consisting essentially of water, soap and water, a detergent, a solvent, sand-blasting, and any combination thereof; and then the applying the coating of the modified PVDF material of claim 1 to the cleaned surface of the concrete. The cleaning the surface of the concrete with a cleaning agent may include: applying the cleaning agent to the surface of the concrete by brushing, rolling and/or spraying.

The method of coating a surface of a concrete structure in situ, wherein the step of applying the coating of a modified PVDF material to the surface of the concrete comprises: applying the coating using a brush or using a roller or using a spraying device or using a combination of the foregoing. The method of coating a surface of a concrete structure in situ, wherein the coating of the modified PVDF material on the surface of the concrete has a thickness of between about 10 microns or about 25 microns and 200 microns. The method of coating a surface of a concrete structure in situ, wherein the coating of the modified PVDF material on the surface of the concrete has a thickness of less than about 150 microns. The method of coating a surface of a concrete structure in situ, wherein the coating of the modified PVDF material on the surface of the concrete has a thickness of at least about 50 microns.

The method of coating a surface of a concrete structure in situ, wherein the compatible acrylic and/or other compatible polymer with the modified PVDF material in an air dryable solution further comprises: acrylic, epoxy, polyurethane, or a blend thereof, of at least 25% by weight.

The method of coating a surface of a concrete structure in situ, wherein the concrete structure includes reinforcing elements therein, the reinforcing elements including reinforcing bars, reinforcing rods, reinforcing mesh, and/or metal beams. The reinforcing elements may include elements of iron, steel, aluminum, copper, another non-noble metal, and/or alloys thereof. The method of coating a surface of a concrete structure in situ, wherein the concrete structure to which the modified PVDF material in an air dryable solution is applied includes: at least vertical load bearing structural elements of the concrete structure; or at least vertical and horizontal load bearing structural elements of the concrete structure. The load bearing structural elements of the concrete structure may include reinforcing elements therein, the reinforcing elements including reinforcing bars, reinforcing rods, reinforcing mesh, and/or metal beams. The method of coating a surface of a concrete structure in situ applies the modified PVDF material in an air dryable solution directly onto the surface of the concrete structure, without needing a primer or other preparatory coating or layer on the surface of the concrete.

The method of coating a surface of a concrete structure in situ, wherein the coating of the modified PVDF material has an elongation capability without fracturing of more than twenty percent (20%). The method of coating a surface of a concrete structure in situ, wherein the coating of the modified PVDF material has an elongation capability without fracturing of more than fifty percent (50%). The method of coating a surface of a concrete structure in situ, wherein the coating of the modified PVDF material has a molecular structure wherein a majority thereof by weight has a glass transition temperature of about 0° C. or lower. The method of coating a surface of a concrete structure in situ, wherein the coating of the modified PVDF material has a molecular structure wherein a majority thereof by weight has a glass transition temperature of about −20° C. or lower. The method of coating a surface of a concrete structure in situ, wherein the coating of the modified PVDF material has a molecular structure wherein a majority thereof by weight has a glass transition temperature of about −40° C. or lower. The method of coating a surface of a concrete structure in situ, wherein the coating of the modified PVDF material: is transparent or clear; or if pigmented, is pigmented with pigments including titanium dioxide (TiO2), zinc oxide, zinc sulphate, barium sulphate, carbon black, or a combination thereof.

As used herein, the term "about" and "substantial" and "substantially" mean that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of ordinary skill in the art. In general, a dimension, size, formulation, parameter, shape or other quantity or characteristic is "about" or "approximate" or "substantial" or "substantially" whether or not expressly stated to be such. It is noted that embodiments of very different sizes, shapes and dimensions may employ the described arrangements.

Although terms such as "front," "back," "rear," "side," "end," "top," "bottom," "up," "down," "left," "right," "upward," "downward," "forward," "backward," "under" and/or "over," "vertical," "horizontal," and the like may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

As used herein, the term "and/or" encompasses both the conjunctive and the disjunctive cases, so that a phrase in the form "A and/or B" encompasses "A" or "B" or "A and B." Likewise, a phrase in the form "A, B and/or C" or a phrase in the form "A and/or B and/or C" includes "A," "B," "C," "A and B," "A and C," "B and C," and "A and B and C." In addition, the term "at least one of" one or more elements is intended to include one of any one of the elements, more than one of any of the elements, and two or more of the elements up to and including all of the elements, and so, e.g., phrases in the form "at least one of A, B and C" include "A," "B," "C," "A and B," "A and C," "B and C," and "A and B and C."

As used herein, the term "predetermined" means determined in advance or before hand with respect to whatever the term pertains to. The term may be used with respect to a physical object or thing and/or with respect to an intangible thing, e.g., a signal or data, and the like. Examples thereof may include a fixed value, position, condition and/or limit, however, predetermined is not limited to a fixed value, position, condition and/or limit. A predetermined value, position, condition and/or limit may change or otherwise vary over time, over a sequence and/or over a randomized series of values, positions, conditions and/or limits.

As used herein, the term "plurality" means plural, two or greater in number of whatever the term pertains to, i.e. more than one. The term may be used with respect to a physical object or thing and/or with respect to an intangible thing, e.g., a signal or data, and the like. Examples thereof may include a fixed or movable thing, a fixed value, a changeable value, position, condition and/or limit, and the like.

As used herein, the terms "substantial" and "substantially" mean that the thing referred to as being "substantial" or "substantially" is sufficiently similar in form and/or function as to function in the invention in a manner that is encompassed by the description and/or claims herein or an equivalent thereof.

While various operations, steps and/or elements of a process or method or operation may be described in an order or sequence, the operations, steps and/or elements do not need to be performed in that order or sequence, or in any particular order or sequence, unless expressly stated to require a particular order or sequence.

Further, what is stated as being "optimum" or "deemed optimum" may or may not be a true optimum condition, but is the condition deemed to be desirable or acceptably "optimum" by virtue of its being selected in accordance with the decision rules and/or criteria defined by the designer and/or applicable controlling function, e.g., while Applicant believes that the thickness of the PVDF coating material should be in the range of 50 to 150 microns, which provides a balance of sufficient moisture protection and reasonable material cost, somewhat thinner coatings will provide a lesser but still substantial measure of moisture resistance, while thicker coatings will provide the same substantial moisture protection but will cost more due to a greater amount of coating material being used.

While the present invention has been described in terms of the foregoing example embodiments, variations within the scope and spirit of the present invention as defined by the claims following will be apparent to those skilled in the art. For example, other means of applying the coating material may be utilized and still produce the same substantial moisture resistance that are produced using the example methods of rolling, brushing and spraying.

While certain features to which the coating materials may be applied may be described as a raised feature, e.g., a column, beam, ridge, boss, flange, projection, detent, or other raised feature, such feature may be positively formed or may be what remains after a recessed feature, e.g., a groove, slot, hole, indentation, recess, detent, or other recessed feature, is made. Similarly, while certain features may be described as a recessed feature, e.g., a groove, slot, hole, indentation, recess or other recessed feature, such feature may be positively formed or may be what remains after a raised feature, e.g., a ridge, boss, flange, projection or other raised feature, is made. In addition, where a raised feature engages a recessed feature, such as a cylindrical projection that engages a complementary receptacle, the relative positions of the raised and recessed features may be interchanged or other wise modified.

Each of the U.S. Provisional Applications, U.S. Patent Applications, and/or U.S. Patents, identified herein is hereby incorporated herein by reference in its entirety, for any purpose and for all purposes irrespective of how it may be referred to or described herein.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A method of coating a surface of a concrete structure in situ, which comprises the step of applying to the surface of the concrete of the concrete structure a liquidous coating of a modified polyvinylidene fluoride (PVDF) or polyvinylidene difluoride (PVDF) material in an air dryable solution comprising:
   (a) a PVDF or a PVDF co-polymer or a combination of PVDF and PVDF copolymer to form a blend with a compatible acrylic and/or other compatible polymer that is fluorinated to between about 30% to about 75% by weight excluding any solvent;
   (b) the PVDF or PVDF co-polymer or blend thereof having a molecular structure that is at least about 45% PVDF by weight when dried;
   (c) the PVDF or PVDF co-polymer having a polymer crystallinity of at least about 30% by weight; and
   (d) a solvent selected from the group consisting essentially of ketones, acetate, ester alcohol, propylene carbonate, a combination thereof, and combinations of solvents having a polarity index in the range of about 3.0 to 7.0;
   (e) wherein the coating has a cross-hatch adhesion to concrete of at least 3B when measured using the ASTM D3359 Method B scale.

2. The method of coating a surface of a concrete structure in situ, of claim 1, which further comprises the steps of:
   (a) brushing the surface of the concrete or cleaning the surface of the concrete with a cleaning agent selected from the group consisting essentially of water, soap and water, a detergent, a solvent, sand-blasting, and any combination thereof; and then
   (b) the applying the coating of the modified PVDF material of claim 1 to the cleaned surface of the concrete.

3. The method of coating a surface of a concrete structure in situ, of claim 2, wherein the step of: cleaning the surface of the concrete with a cleaning agent includes:
   applying the cleaning agent to the surface of the concrete by brushing, rolling and/or spraying.

4. The method of coating a surface of a concrete structure in situ, of claim 1, wherein the step of applying the coating of a modified PVDF material to the surface of the concrete comprises: applying the coating using a brush or using a roller or using a spraying device or using a combination of the foregoing.

5. The method of coating a surface of a concrete structure in situ, of claim 1, wherein the coating of the modified PVDF material on the surface of the concrete has a thickness of between about 10 microns and 200 microns.

6. The method of coating a surface of a concrete structure in situ, of claim 1, wherein the coating of the modified PVDF material on the surface of the concrete has a thickness of less than about 150 microns.

7. The method of coating a surface of a concrete structure in situ, of claim 1, wherein the coating of the modified PVDF material on the surface of the concrete has a thickness of at least about 50 microns.

8. The method of coating a surface of a concrete structure in situ, of claim 1, wherein the compatible acrylic and/or other compatible polymer of the modified PVDF material in an air dryable solution includes: an acrylic, an epoxy, a polyurethane, or a blend thereof, of at least 25% by weight.

9. The method of coating a surface of a concrete structure in situ, of claim 1, wherein the concrete structure includes reinforcing elements therein, the reinforcing elements including reinforcing bars, reinforcing rods, reinforcing mesh, and/or metal beams.

10. The method of coating a surface of a concrete structure in situ, of claim 9, wherein the reinforcing elements include elements of iron, steel, aluminum, copper, another non-noble metal, and/or alloys thereof.

11. The method of coating a surface of a concrete structure in situ, of claim 1, wherein the concrete structure to which the modified PVDF material in an air dryable solution is applied includes:
    at least vertical load bearing structural elements of the concrete structure; or
    at least vertical and horizontal load bearing structural elements of the concrete structure.

12. The method of coating a surface of a concrete structure in situ, of claim 11, wherein the load bearing structural elements of the concrete structure include reinforcing elements therein, the reinforcing elements including reinforcing bars, reinforcing rods, reinforcing mesh, and/or metal beams.

13. The method of coating a surface of a concrete structure in situ, of claim 1, which further comprises the step of applying to the surface of the coating of a modified polyvinylidene fluoride (PVDF) or polyvinylidene difluoride (PVDF) material applied on the concrete of the concrete structure a liquidous over-coating of a modified polyvinylidene fluoride (PVDF) or polyvinylidene difluoride (PVDF) material in an air dryable solution comprising:
    (a) a PVDF or a PVDF co-polymer or a blend thereof that is fluorinated to between about 30% to about 75% by weight excluding any solvent;
    (b) the PVDF or PVDF co-polymer or blend thereof having a molecular structure that is at least about 75% PVDF by weight when dried;
    (c) the PVDF or PVDF co-polymer having a polymer crystallinity of at least about 30% by weight; and
    (d) a solvent selected from the group consisting essentially of ketones, acetate, ester alcohol, propylene carbonate, a combination thereof, and combinations of solvents having a polarity index in the range of about 3.0 to 7.0.

14. The method of coating a surface of a concrete structure in situ, of claim 13, wherein the step of applying the over-coating of a modified PVDF material comprises: applying the over-coating using a brush or using a roller or using a spraying device or using a combination of the foregoing.

15. The method of coating a surface of a concrete structure in situ, of claim 13, wherein the over-coating of the modified PVDF material has a thickness of between about 25 microns and 200 microns.

16. The method of coating a surface of a concrete structure in situ, of claim 13, wherein the over-coating of the modified PVDF material has a thickness of less than about 150 microns.

17. The method of coating a surface of a concrete structure in situ, of claim 13, wherein the over-coating of the modified PVDF material has a thickness of at least about 50 microns.

18. The method of coating a surface of a concrete structure in situ, of claim 13, wherein the compatible acrylic and/or other compatible polymer of the modified PVDF material in an air dryable solution includes: an acrylic, an epoxy, a polyurethane, or a blend thereof.

19. The method of coating a surface of a concrete structure in situ, of claim 1, wherein the surface of the concrete structure was previously coated with an epoxy, an acrylic, an alkyd, a polyurethane or another polar coating.

20. A method of coating a surface of a concrete structure in situ, which comprises the step of applying to the surface of the concrete of the concrete structure a liquidous coating of a modified polyvinylidene fluoride (PVDF) or polyvinylidene difluoride (PVDF) material in an air dryable solution comprising:
- (a) a PVDF or a PVDF co-polymer or a combination of PVDF and PVDF copolymer to form a blend with a compatible acrylic and/or other compatible polymer that is fluorinated to between about 30% to about 75% by weight excluding any solvent;
- (b) the PVDF or PVDF co-polymer or blend thereof having a molecular structure that is at least about 45% PVDF by weight when dried;
- (c) the PVDF or PVDF co-polymer having a polymer crystallinity of at least about 30% by weight; and
- (d) a solvent selected from the group consisting essentially of ketones, acetate, ester alcohol, propylene carbonate, a combination thereof, and combinations of solvents having a polarity index in the range of about 3.0 to 7.0;
- (e) wherein the coating has a cross-hatch adhesion to concrete of at least 3B when measured using the ASTM D3359 Method B scale; and the method of coating a surface of a concrete structure in situ, which further comprises the step of applying to the surface of the coating of a modified polyvinylidene fluoride (PVDF) or polyvinylidene difluoride (PVDF) material applied on the concrete of the concrete structure a liquidous over-coating of a modified polyvinylidene fluoride (PVDF) or polyvinylidene difluoride (PVDF) material in an air dryable solution comprising:
- (a) a PVDF or a PVDF co-polymer or a blend thereof that is fluorinated to between about 30% to about 75% by weight excluding any solvent;
- (b) the PVDF or PVDF co-polymer or blend thereof having a molecular structure that is at least about 75% PVDF by weight when dried;
- (c) the PVDF or PVDF co-polymer having a polymer crystallinity of at least about 30% by weight; and
- (d) a solvent selected from the group consisting essentially of ketones, acetate, ester alcohol, propylene carbonate, a combination thereof, and combinations of solvents having a polarity index in the range of about 3.0 to 7.0.

* * * * *